US012629760B2

(12) United States Patent (10) Patent No.: US 12,629,760 B2
Van Essen et al. (45) Date of Patent: May 19, 2026

(54) DIE HEAD FOR PIPE THREADER

(71) Applicant: MILWAUKEE ELECTRIC TOOL CORPORATION, Brookfield, WI (US)

(72) Inventors: James J. Van Essen, Hales Corners, WI (US); Benjamin L. Miller, Milwaukee, WI (US); David Hlavac, Colgate, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 563 days.

(21) Appl. No.: 18/001,484

(22) PCT Filed: Jun. 25, 2021

(86) PCT No.: PCT/US2021/039163
§ 371 (c)(1),
(2) Date: Dec. 12, 2022

(87) PCT Pub. No.: WO2021/263147
PCT Pub. Date: Dec. 30, 2021

(65) Prior Publication Data
US 2023/0271263 A1      Aug. 31, 2023

Related U.S. Application Data

(60) Provisional application No. 63/044,551, filed on Jun. 26, 2020.

(51) Int. Cl.
*B23G 5/10* (2006.01)
*B23G 1/24* (2006.01)

(52) U.S. Cl.
CPC ................. *B23G 5/10* (2013.01); *B23G 1/24* (2013.01)

(58) Field of Classification Search
CPC ...... B23G 1/24; B23G 5/10; Y10T 408/90473
See application file for complete search history.

(56) References Cited

U.S. PATENT DOCUMENTS 1,650,778 A      11/1927   White
1,672,676 A       6/1928   Cox
(Continued)

FOREIGN PATENT DOCUMENTS

CN          201338144 Y      11/2009
CN          202180268 U       4/2012
(Continued)

OTHER PUBLICATIONS

International Search Report and Written Opinion for Application No. PCT/US2021/039163 dated Oct. 25, 2021 (8 pages).
(Continued)

*Primary Examiner* — Eric A. Gates
(74) *Attorney, Agent, or Firm* — Michael Best & Friedrich LLP

(57) ABSTRACT

A die head for cutting threads in a pipe. The die head includes a drive portion, a die retention portion, a cap, and a plurality of windows. The drive portion has a plurality of recesses configured to receive torque from a pipe threading machine. The die retention portion includes a plurality of die posts. Each die post is configured to receive a die having teeth for cutting the threads in the pipe. The cap is coupled to the die retention portion. Each window is defined between each pair of adjacent die posts and the cap. An end of each die adjacent the cap is visible through a corresponding window of the plurality of windows such that all of the teeth of the die are visible through the corresponding window.

15 Claims, 12 Drawing Sheets

(56)                References Cited

U.S. PATENT DOCUMENTS

| | | | | |
|---|---|---|---|---|
| 1,956,182 | A | 4/1934 | Thewes | |
| 1,973,232 | A | 9/1934 | Thewes | |
| 1,999,207 | A | 4/1935 | Pealer | |
| 2,004,333 | A | 6/1935 | Maurer | |
| 2,150,037 | A | 3/1939 | Reed et al. | |
| 2,166,369 | A | 7/1939 | Petersen | |
| 2,232,854 | A * | 2/1941 | Hogg | B23G 5/10 |
| | | | | 408/150 |
| 2,242,954 | A | 5/1941 | Ingwer | |
| 2,600,349 | A * | 6/1952 | Watson | B23G 5/10 |
| | | | | 279/42 |
| 2,675,770 | A | 4/1954 | Rabinowitz | |
| 2,680,861 | A | 6/1954 | Ingwer et al. | |
| 2,757,392 | A | 8/1956 | Petersen | |
| 2,809,845 | A | 10/1957 | Emrick | |
| 2,855,611 | A | 10/1958 | Bjalme | |
| 2,864,102 | A | 12/1958 | Budnick | |
| 2,885,698 | A | 5/1959 | Bjalme | |
| 2,938,222 | A | 5/1960 | Bjalme | |
| 3,521,313 | A * | 7/1970 | Baker | B23G 5/10 |
| | | | | 408/124 |
| 3,811,145 | A | 5/1974 | Fink | |
| 4,068,977 | A | 1/1978 | Rossetti | |
| 4,213,723 | A | 7/1980 | Wagner | |
| 5,890,852 | A | 4/1999 | Gress | |
| 9,095,917 | B2 | 8/2015 | Patil et al. | |
| 2007/0031202 | A1 | 2/2007 | Mu et al. | |
| 2014/0017020 | A1 | 1/2014 | Luik | |
| 2016/0008902 | A1 | 1/2016 | Voege | |
| 2019/0283157 | A1 | 9/2019 | VanDaalwyk et al. | |
| 2020/0189017 | A1 | 6/2020 | Ceroll et al. | |

FOREIGN PATENT DOCUMENTS

| | | | | |
|---|---|---|---|---|
| CN | 102528180 | A | 7/2012 | |
| CN | 202527812 | U | 11/2012 | |
| CN | 203887344 | U | 10/2014 | |
| CN | 205254279 | U | 5/2016 | |
| CN | 207642440 | U | 7/2018 | |
| DE | 465313 | C | 9/1928 | |
| DE | 551995 | C | 6/1932 | |
| DE | 939066 | C | 2/1956 | |
| DE | 1924952 | A1 | 6/1971 | |
| DE | 8408377 | U1 | 7/1984 | |
| DE | 3410016 | A1 | 9/1985 | |
| DE | 3824115 | A1 | 11/1989 | |
| DE | 19500515 | A1 | 7/1996 | |
| DE | 202012103423 | U1 | 10/2012 | |
| EP | 0023763 | A1 | 2/1981 | |
| EP | 0263771 | A1 * | 4/1988 | B23G 5/10 |
| EP | 2705920 | A2 | 3/2014 | |
| EP | 3178594 | B1 | 6/2018 | |
| FR | 947637 | A * | 7/1949 | |
| JP | 2008073843 | A | 4/2008 | |
| KR | 1020180028228 | A | 3/2018 | |
| WO | 2012117033 | A1 | 9/2012 | |

OTHER PUBLICATIONS

Extended European Search Report for Application No. 21828472.7 dated Jul. 11, 2024 (10 pages).

* cited by examiner 234
262
236
239

236
237

334

377
376
374
375
362

234

376
377
374
375
362

DIE HEAD FOR PIPE THREADER

CROSS-REFERENCE TO RELATED APPLICATIONS

This application is a national stage filing under 35 U.S.C. § 371 of International Application No. PCT/US2021/039163, filed on Jun. 25, 2021, which claims priority to U.S. Provisional Patent Application No. 63/044,551, filed on Jun. 26, 2020, the entire contents of which are incorporated herein by reference.

FIELD OF THE INVENTION

The present invention relates to pipe threaders, and more particularly to die heads for pipe threaders.

BACKGROUND OF THE INVENTION

Pipe threaders include a die holder to hold a die that cuts threads on a pipe. A motor transmits torque to the die holder to rotate the die with respect to the pipe.

SUMMARY OF THE INVENTION

The present invention provides, in one aspect, a die head for cutting threads in a pipe. The die head includes a drive portion, a die retention portion, a cap, and a plurality of windows. The drive portion has a plurality of recesses configured to receive torque from a pipe threading machine. The die retention portion includes a plurality of die posts. Each die post is configured to receive a die having teeth for cutting the threads in the pipe. The cap is coupled to the die retention portion. Each window is defined between each pair of adjacent die posts and the cap. An end of each die adjacent the cap is visible through a corresponding window of the plurality of windows such that all of the teeth of the die are visible through the corresponding window.

The present invention provides, in another aspect, a die head including a drive portion, a die retention portion, a cap, and a plurality of windows. The drive portion has a plurality of recesses configured to receive torque from a pipe threading machine. The die retention portion includes a plurality of die posts. Each die post is configured to receive a die. Each die post has a top surface opposite from the drive portion, the top surfaces defining a first plane. The cap is coupled to the die retention portion. The cap includes a plurality of mating posts and a plurality of ledges arranged between the plurality of mating posts. Each mating post is configured to mate with the top surface of a corresponding die post. The plurality of ledges define a second plane that is spaced from a parallel with the first plane. Each window is defined between a pair of adjacent die posts and a corresponding ledge of the plurality of ledges.

The present invention provides, in another aspect, a die head including a drive portion having a plurality of recesses configured to receive torque from a pipe threading machine, and a die retention portion couple to the drive portion. The die retention portion includes a plurality of die posts. Each die post is configured to receive a die. The die retention portion is composed of aluminum.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
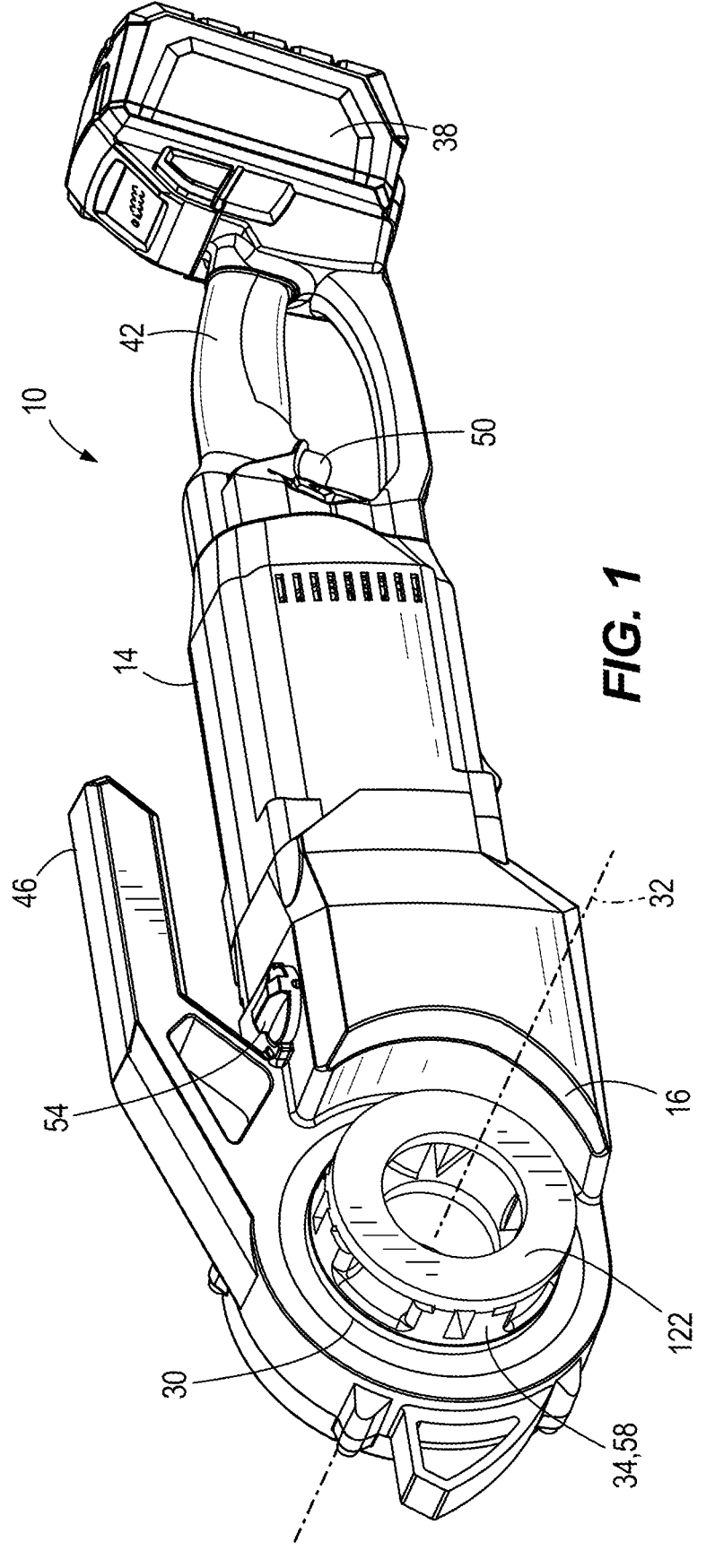
FIG. 1 is a perspective view of a pipe threader.
Figure 2:
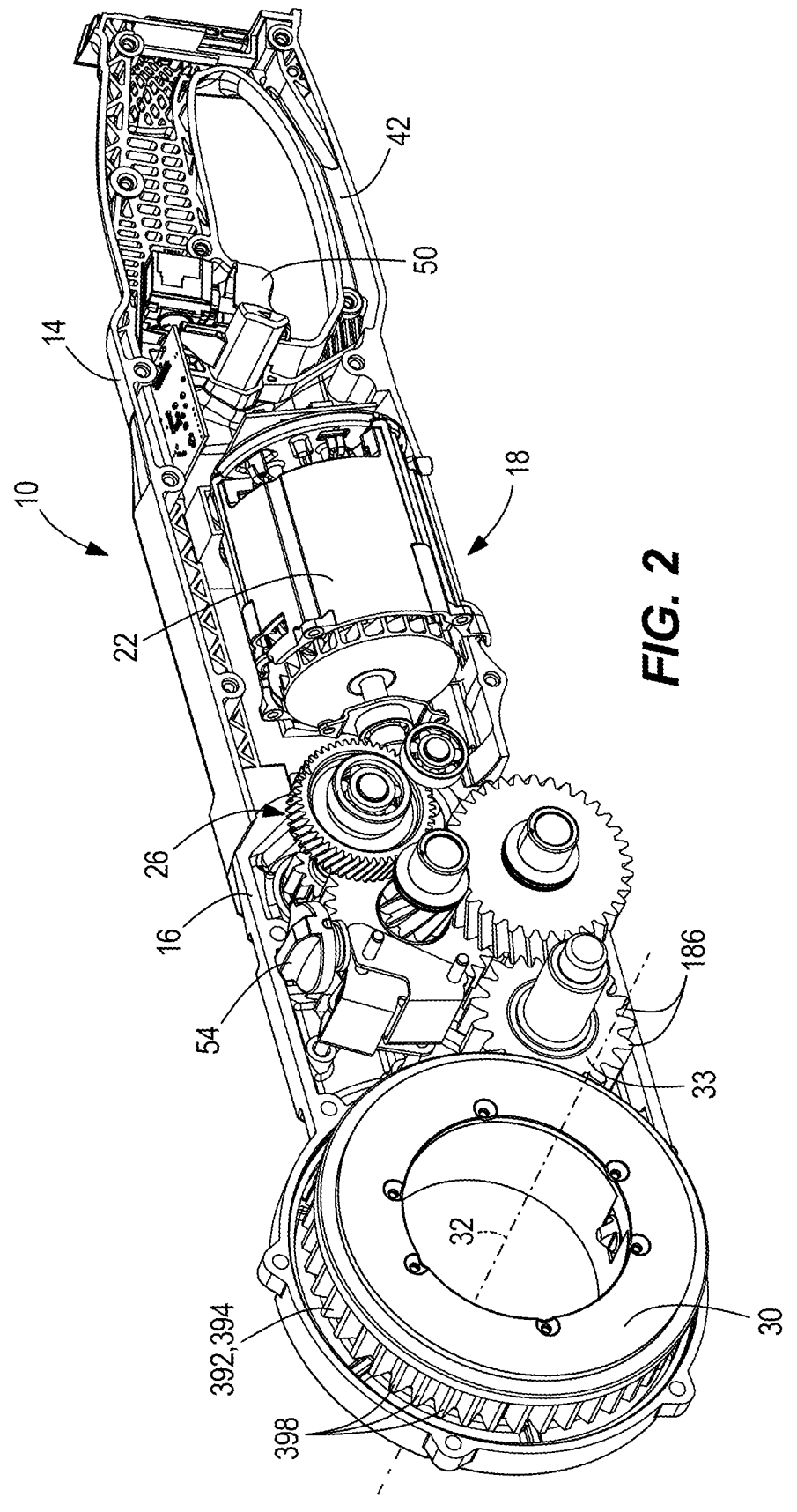
FIG. 2 is a perspective view of the pipe threader of FIG. 1 with portions removed.

FIGS. 1 and 2 illustrate a pipe threader 10 having a housing 14 including a gearcase 16, a drive assembly 18 including a motor 22 and a transmission 26, and a die head retainer 30 defining a rotational axis 32. The die head retainer 30 selectively receives a die head 34 for cutting threads on a pipe (not shown). As shown in FIG. 2, the transmission 26 includes an output gear 33 for transmitting torque to the die head retainer 30, as explained in further detail below. In some embodiments, the die head 34 is configured to cut threads into a pipe having a 0.5-inch, 0.75-inch, 1-inch, 1.25-inch, 1.5-inch, or 2-inch diameter. Sometimes, a six-piece die head set includes six separate die heads 34 for each of the different pipe diameters, with each die head 34 having different dimensions configured to facilitate threading pipes of the different diameters.

The motor 22 is powered by a battery 38 that is selectively coupled to the housing 14. In some embodiments, the battery 38 is a nickel-cadmium battery. In some embodiments, the battery 38 is a lithium ion battery. In some embodiments, the battery 38 is a battery pack that is interchangeably connectable to the pipe threader 10 and to a plurality of different power tools to supply power thereto. As explained in further detail below, the transmission 26 transmits torque from the motor 18 to the die head retainer 30, such that the die head retainer 30 rotates while holding the die head 34, causing the die head 34 to cut threads on a pipe.

With continued reference to FIGS. 1 and 2, the housing 14 includes an operating handle 42 and a support handle 46 near the die head retainer 30. The pipe threader 10 includes a trigger 50, or other actuator, on the operating handle 42 for activating the motor 22. The pipe threader 10 also includes a speed shift knob 54, or other actuator, allowing an operator to switch the die head retainer 30 (and thus the die head 34) between a high rotational speed and a low rotational speed.

Figures 3, 4:
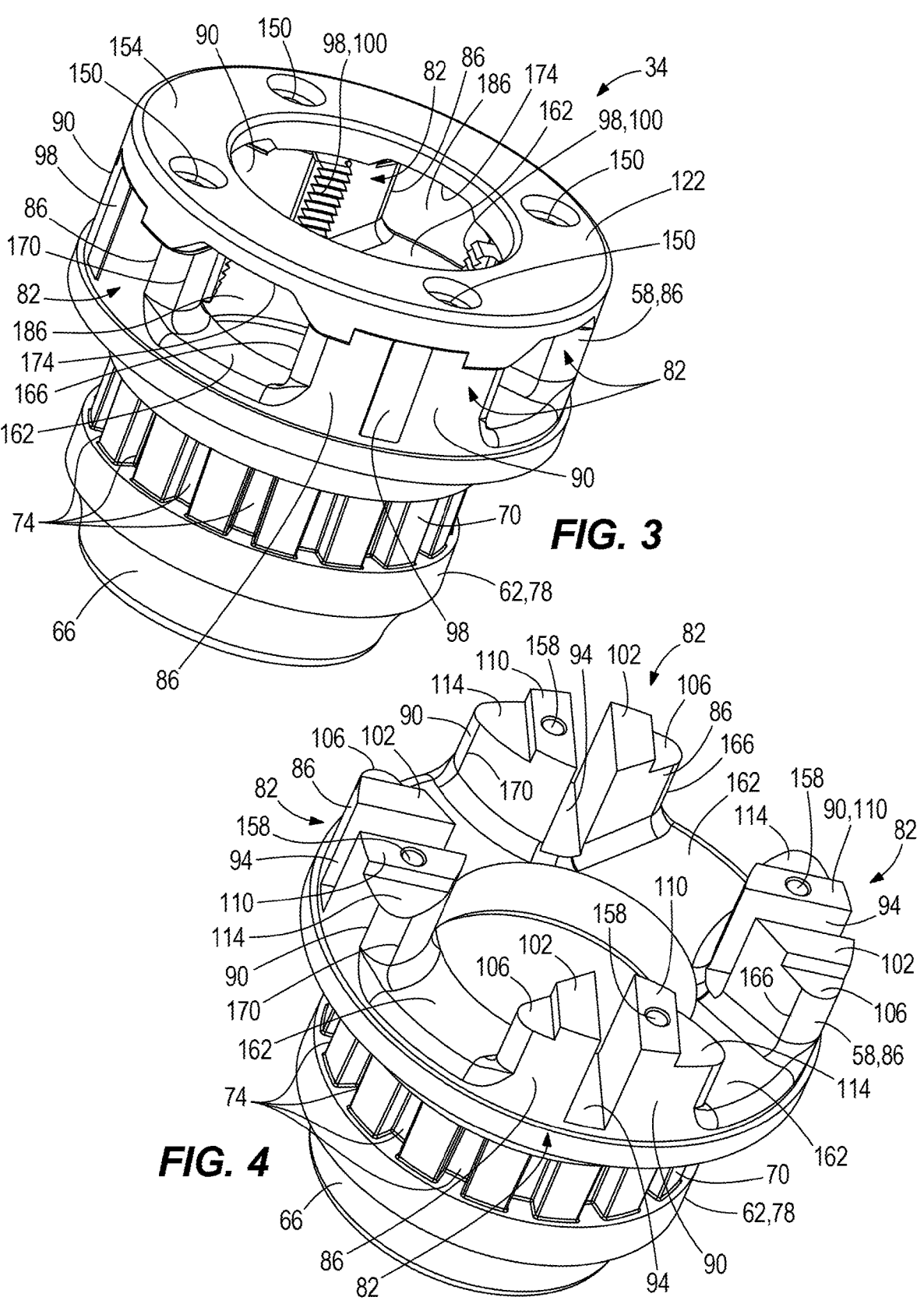
FIG. 3 is a perspective view of a die head for use with the pipe threader of FIG. 1.
FIG. 4 is a perspective view of the die head of FIG. 3, with portions removed.
Figures 5, 6:
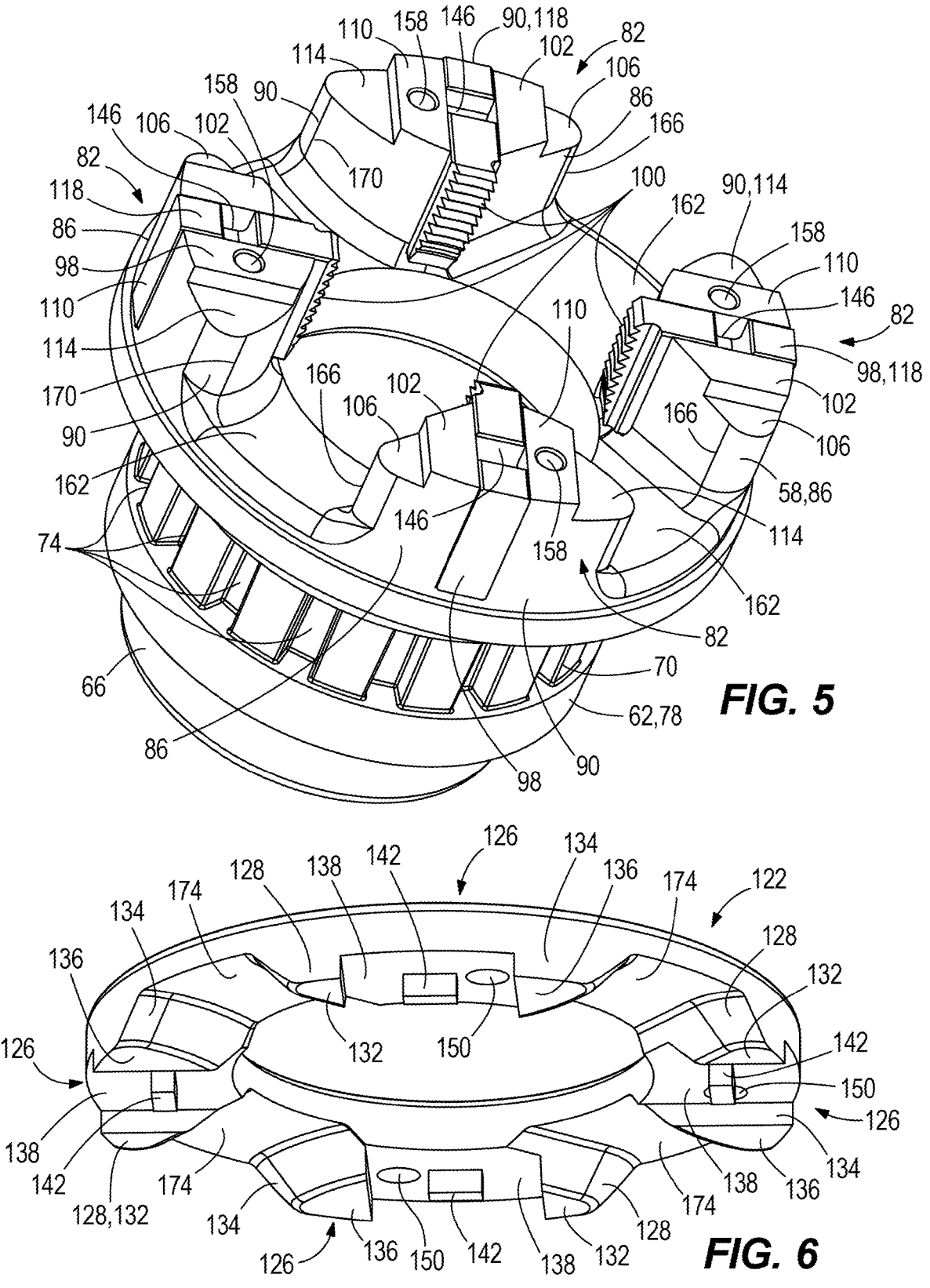
FIG. 5 is a perspective view of the die head of FIG. 3, with portions removed.
FIG. 6 is a perspective view of a cap of the die head of FIG. 3.
Figure 7:
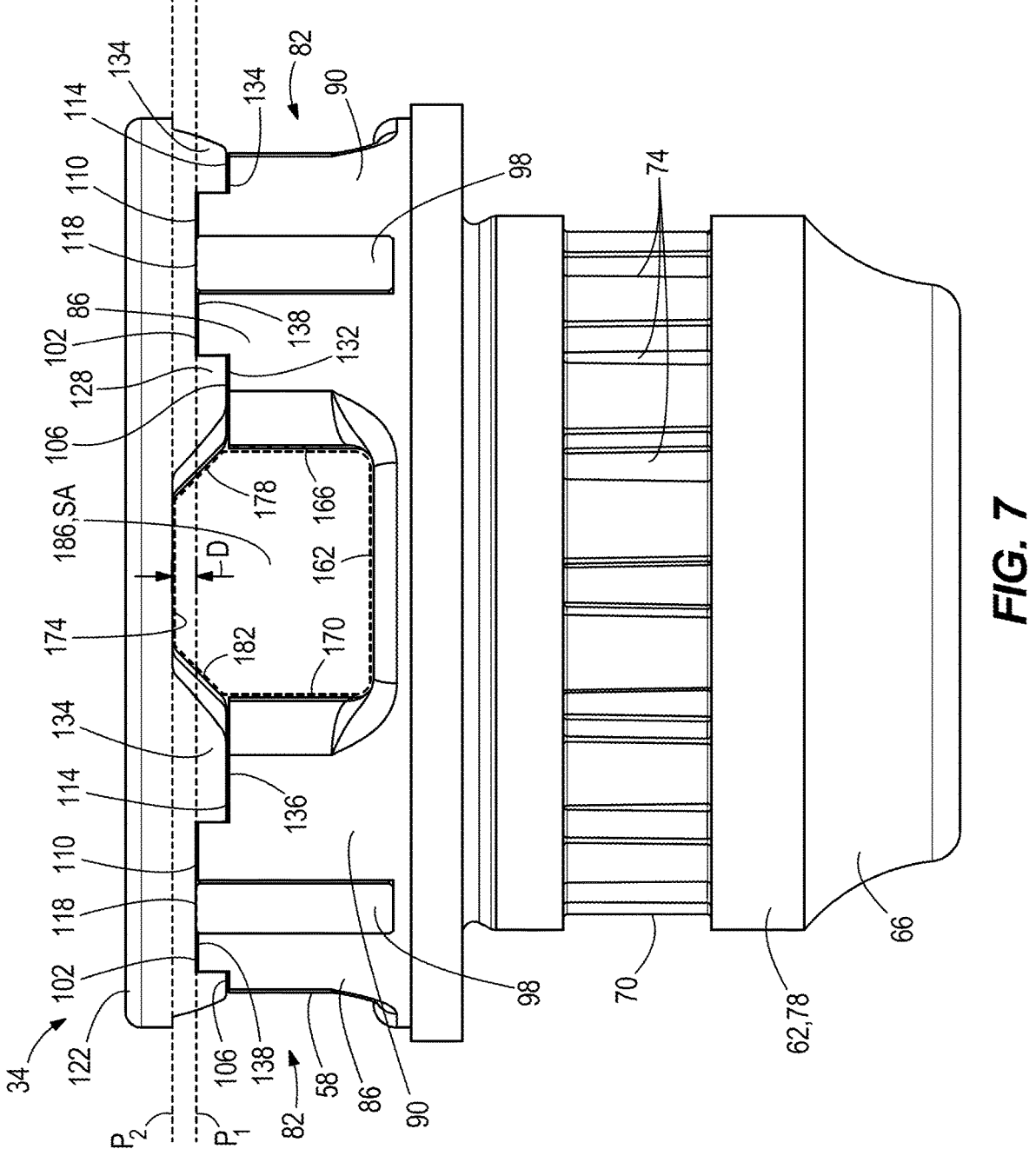
FIG. 7 is a plan view of the die head of FIG. 3.

FIGS. 3-7 illustrate the die head 34 in more detail. Specifically, the die head 34 includes a die retention portion 58 and a drive portion 62. The drive portion 62 includes a curvilinear end 66, a circumferential engagement portion 70 with a plurality of discrete recesses 74 therein, and a cylindrical portion 78 between the engagement portion 70 and the curvilinear end 66. The die retention portion 58 includes a plurality of die posts 82. In the illustrated embodiment, the die retention portion 58 includes four die posts 82. In other embodiments, the die retention portion 58 may include fewer or more die posts 82. Each die post 82 includes a first half 86, a second half 90, and a slot 94 (FIG. 4) between the first and second halves 86, 90. Each slot 94 is configured to receive a die 98 having teeth 100, such that when dies 98 are secured in all of the slots 94, the teeth 100 of the dies 98 are configured to cut threads into a pipe. As shown in FIG. 4, each first half 86 includes a top surface 102 and a subsurface 106 that is offset from the top surface 102. Each second half 90 includes a top surface 110 and a subsurface 114 that is offset from the top surface 110. As shown in FIGS. 5 and 7, each die 98 includes a top surface 118 that, when the die 98 is arranged in the slot 94, defines a first plane $P_1$ that is coplanar with the top surfaces 102, 110, respectively, of the first and second halves 86, 90 of each die post 82.

As shown in FIGS. 3, 6 and 7, the die head 34 also includes a cap 122 for securing the dies 98 to the die retention portion 58. Specifically, the cap 122 includes a plurality of mating posts 126 (FIG. 6). Each mating post 126 is configured to respectively mate with one of the die posts 82 of the die retention portion 58. Each mating post 126 includes a first half 128 with a first surface 132 configured to mate against the subsurface 106 of the first half 86 of each die post 82, a second half 134 with a second surface 136 configured to mate against the subsurface 114 of the second half 90 of each die post 82, and a third surface 138 in between each first and second half 128, 134. Each third surface 138 is configured to mate against the top surfaces 102, 110 of the first and second halves 86, 90, as well as the top surface 118 of each die 98. Each third surface 138 includes a protrusion 142 (FIG. 6) configured to fit within a notch 146 (FIG. 5) of each die 98, thereby radially locking the die 98 within the die head 34, when the cap 122 is secured on the die retention portion 58. The cap 122 also includes a plurality of bores 150 that extend through a top surface 154 of the cap 122 and through each third surface 138 of each mating post 126. When the cap 122 is arranged on the die retention portion 58, fasteners can be set through the bores 150 and extend into bores 158 in each top surface 110 of each second half 90, thus axially securing the cap 122 and the dies 98 on the die retention portion 58.

With reference to FIG. 7, the die retention portion 58 includes a plurality of ledges 162. Each ledge 162 is arranged between a pair of adjoining die posts 82. Also, the first half 86 of each die post 82 includes a first boundary edge 166, and the second half 90 of each die post 82 includes a second boundary edge 170. With continued reference to FIG. 7, the cap 122 includes a plurality of ledges 174. Each ledge 174 is arranged between a pair of adjacent mating posts 126. The ledge 174 defines a second plane $P_2$ that is parallel with the first plane $P_1$ and separated from the first plane $P_1$ by a distance D. In some embodiments, the distance D is 2 millimeters (mm). In some embodiments, the distance D is 3 mm. In other embodiments, the distance D is greater than 3 mm.

With continued reference to FIG. 7, the first half 128 of each mating post 126 includes a first cap boundary edge 178, and the second half 134 of each mating post 126 includes a second cap boundary edge 182. When the cap 122 is secured to the die retention portion 58, a window 186 is defined between each pair of adjoining die posts 82. Specifically, between each pair of adjoining die posts 82, the window 186 is defined between ledge 162, first boundary edge 166, second boundary edge 170, ledge 174, first cap boundary edge 178, and second cap boundary edge 182. Each window 186 has a surface area SA demarcated by ledge 162, first boundary edge 166, second boundary edge 170, ledge 174, first cap boundary edge 178, and second cap boundary edge 182.

Table 1 below illustrates a surface area SA' of the window 186' in a conventional die head 34'. The conventional die head 34' is not shown in the Figures, but has similar features (noted in this paragraph by addition of an apostrophe) of the die head 34, except for the differences explained below. In the conventional die head 34', the second plane $P_2$' is coplanar with the first plane $P_1$'. Specifically, in the conventional die head 34', when the cap 122' is secured to the die retention portion 58', the ledges 174' are coplanar with the top surfaces 102', 110' of the first and second halves 86', 90', as well as the top surface 118' of each die 82'. Table 1 also lists each conventional head 34' in a six-die head set.

TABLE 1

| Conventional Die Head 34' for Pipe Diameter (inches) | Surface Area SA' of Window 186' (mm²) |
|---|---|
| 0.5 | 193.5 |
| 0.75 | 251.6 |
| 1 | 400.9 |
| 1.25 | 516.8 |
| 1.5 | 675.6 |
| 2 | 746.5 |

For comparison, Table 2 illustrates the surface area SA of the window 186 for the die head 34, in which the second plane $P_2$ is parallel with and offset from the first plane $P_1$ by distance D. Table 1 also lists each die head 34 in a six die set.

TABLE 2

| Die Head 34 for Pipe Diameter (inches) | Distance D (mm) | Surface Area SA of Window 186 (mm²) |
|---|---|---|
| 0.5 | 2 | 217.1 |
| 0.75 | 2 | 281.2 |
| 1 | 2 | 438.9 |

TABLE 2-continued

| Die Head 34 for Pipe Diameter (inches) | Distance D (mm) | Surface Area SA of Window 186 (mm²) |
|---|---|---|
| 1.25 | 2 | 569.0 |
| 1.5 | 3 | 764.1 |
| 2 | 3 | 844.3 |

As shown by comparing Tables 1 and 2, by arranging ledges 174 of cap 122 such that the second plane $P_2$ is offset from the first plane $P_1$ by the distance D, the surface area SA of each window 186 of the die head 34 is increased. As compared with the conventional die head 34', the increased surface area SA makes it easier for an operator to view the threading operation as it is occurring, as the operator can see the teeth 100 of the dies 98 as the dies 98 cut threads into the pipe. Specifically, the operator is able to see a final thread of the threads being cut into the pipe by the dies 98. The operator is also able to see all of the teeth on each die 98 through a corresponding window 186. Thus, an operator is more quickly able to ascertain progress of the threading operation, and diagnose problems as they arise. The larger surface area SA of each window 186 also makes it easier for the operator to apply oil to the pipe and dies 98 during the threading operation.

Figure 8:
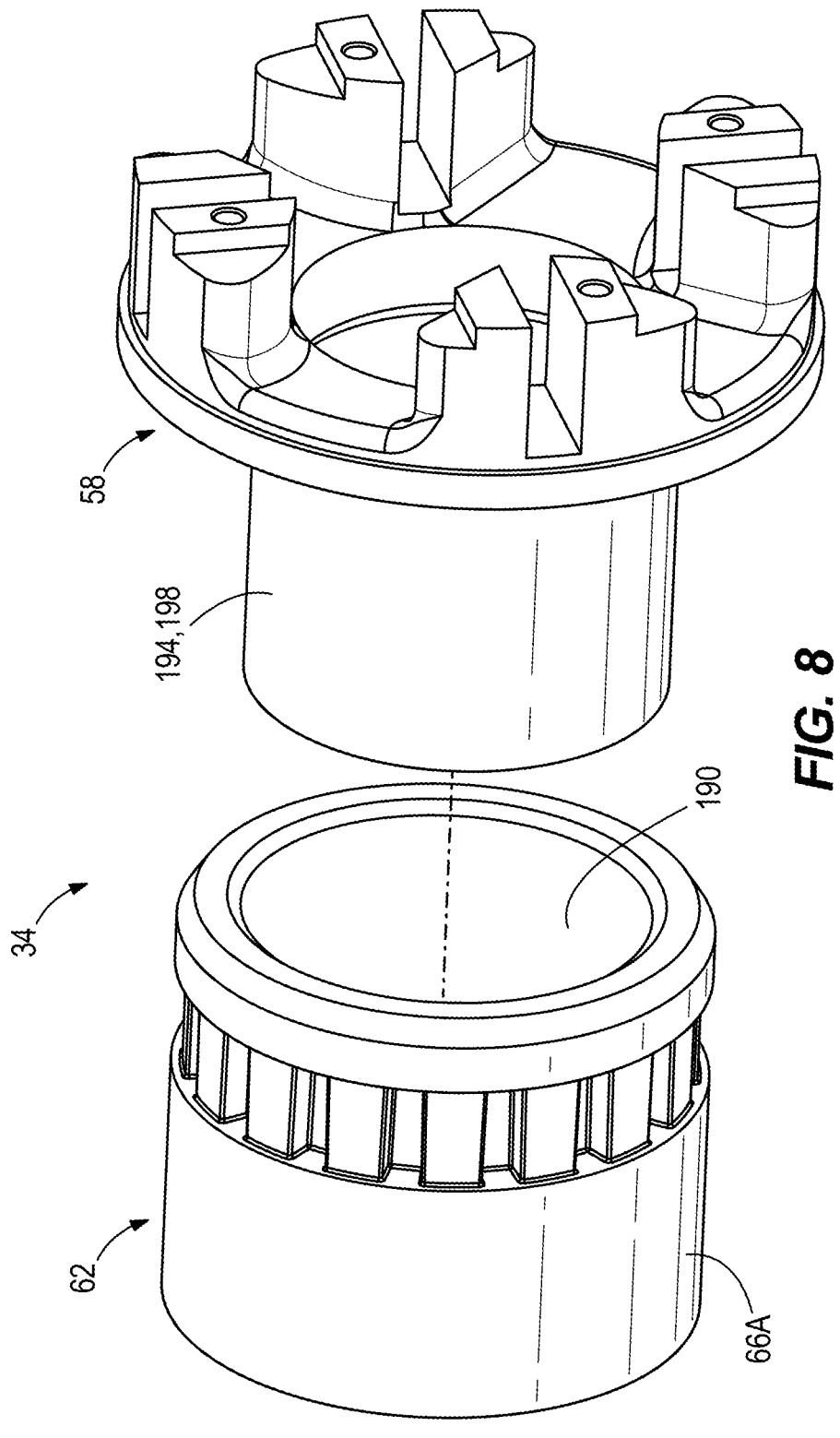
FIG. 8 is an exploded view of a die head according to an embodiment of the invention.
Figures 9, 10:
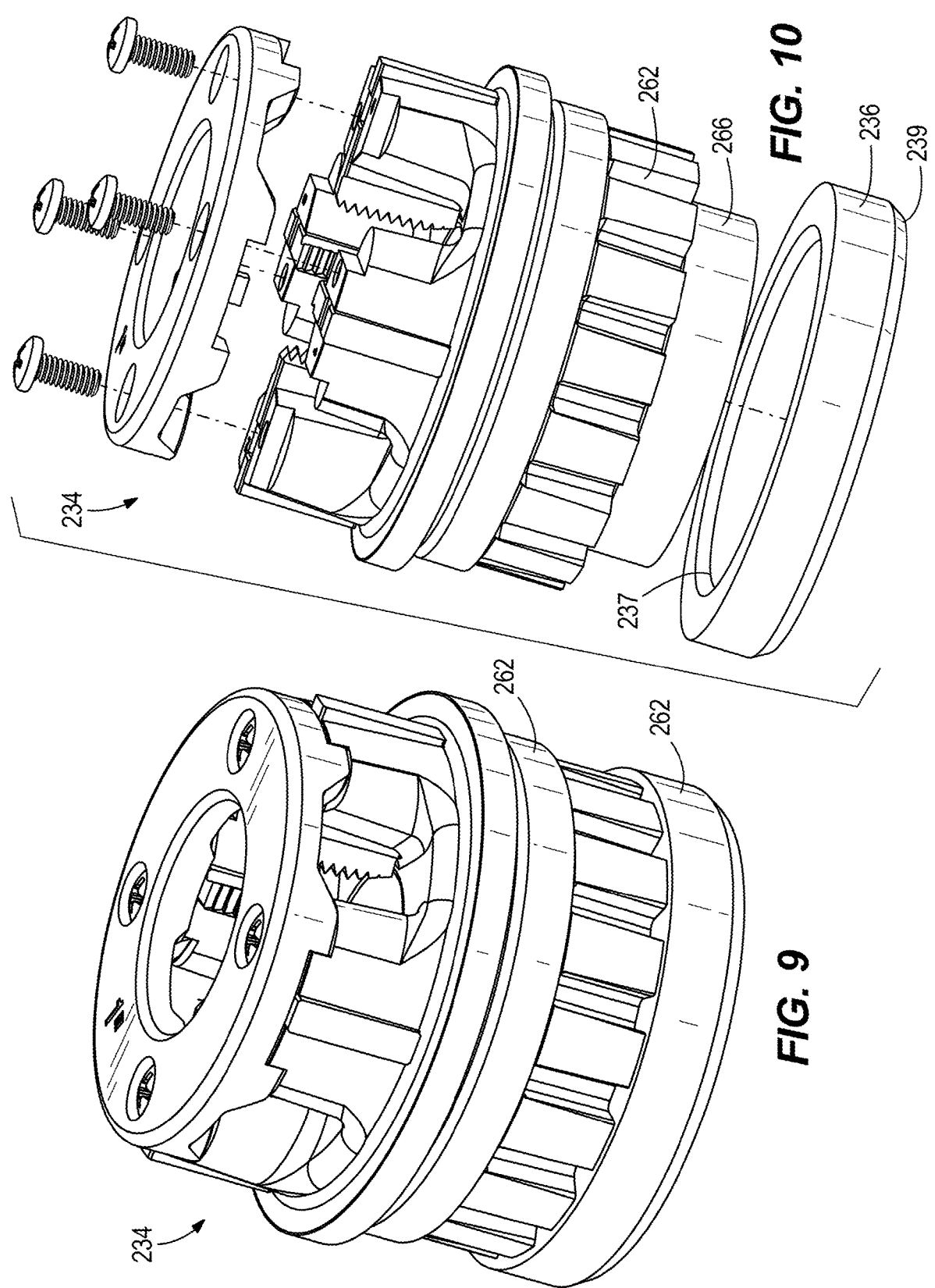
FIG. 9 is a perspective view of a die head according to an embodiment of the invention.
FIG. 10 is an exploded view of the die head of FIG. 9.

As shown in FIG. 8, in some embodiments, the die head 34 is a two-part piece having a drive portion 62 formed of a first material and a separate die retention portion 58 formed of a second material. The first material may be a harder material, while the second material may be a lighter weight material. For example, the first material may be steel, and the second material may be aluminum. Specifically, the drive portion 62 has an inner diameter portion 190 that is coupled to (e.g. via interference fit) an outer diameter portion 194 of an extension portion 198 of the die retention portion 58, such that the drive portion 62 is axially and rotationally fixed to the die retention portion 58. FIG. 8 also illustrates the drive portion 62 alternatively having a straight end 66A instead of a curvilinear end.

In a different embodiment, a die head 34" (not shown, but discussed in Table 3 below) may be a single integral piece formed (e.g. via casting) of aluminum, such that the die retention and drive portions 58", 62" are both formed of aluminum. Also, since the die head 34" is a single integral piece, the drive portion 62" includes no inner diameter portion and the die retention portion 58" includes no extension portion. As discussed in further detail below, the conventional die head 34' is a single integral piece formed of steel, such that the that the die retention and drive portions 58', 62' are both formed of steel. Also, since the die head 34' is a single integral piece, the drive portion 62' includes no inner diameter portion and the die retention portion 58' includes no extension portion.

Table 3 below identifies the weight differences between the all-steel conventional die head 34', and the two-part die head 34 with a steel drive portion 62 and aluminum die retention portion 58, and the die head 34" formed of aluminum. Weights in pounds (lb) are listed for each die head in a six-die head set, with each die head configured to cut pipe of a different diameter.

TABLE 3

| Pipe Diameter (inches) | Weight (lb) of Conventional Steel Die Head 34' | Weight (lb) of Aluminum Die Head 34" | Weight (lb) of Die Head 34, with aluminum die retention portion 58 and separate steel drive portion 62 |
|---|---|---|---|
| 0.5 | 4.13 | 1.71 | 2.59 |
| 0.75 | 3.93 | 1.67 | 2.55 |
| 1 | 4.66 | 2.04 | 2.92 |
| 1.25 | 4.46 | 2.02 | 2.90 |
| 1.5 | 6.02 | 2.58 | 3.46 |
| 2 | 5.73 | 2.6 | 3.51 |
| Total Weight for 6 Piece Die Head Set | 28.92 | 12.62 | 17.94 |

As shown in Table 3, the weight of each individual die head 34, when the die retention portion 58 is formed of aluminum and the drive portion 62 is a separate part formed of steel, is less than the all-steel conventional die head 34'. Also, the total weight of the six-piece die head set (17.94 lb) is 37.96% less than the total weight (28.92 lb) of the six piece die head set for the conventional die head 34'. This embodiment provides the advantage that the drive portion 62 is formed of steel, which is stronger than aluminum, but because the die retention portion 58 is formed of aluminum, the die head 34 is lighter than the conventional die head 34'.

As also shown in Table 3, the weight of each individual aluminum die head 34", is less than the conventional die head 34'. Also, the total weight of the six-piece die head set for the die head 34" (12.62 lb) is 56.36% less than the total weight (28.92 lb) of the six piece die head set for the conventional die head 34', providing an even greater reduction in weight than the steel drive portion 62 embodiment. By forming the die head 34" off aluminum, the die head 34" is lighter, making each individual die head 34", as well as the six-piece die head set, easier to carry for an operator.

Figure 11:
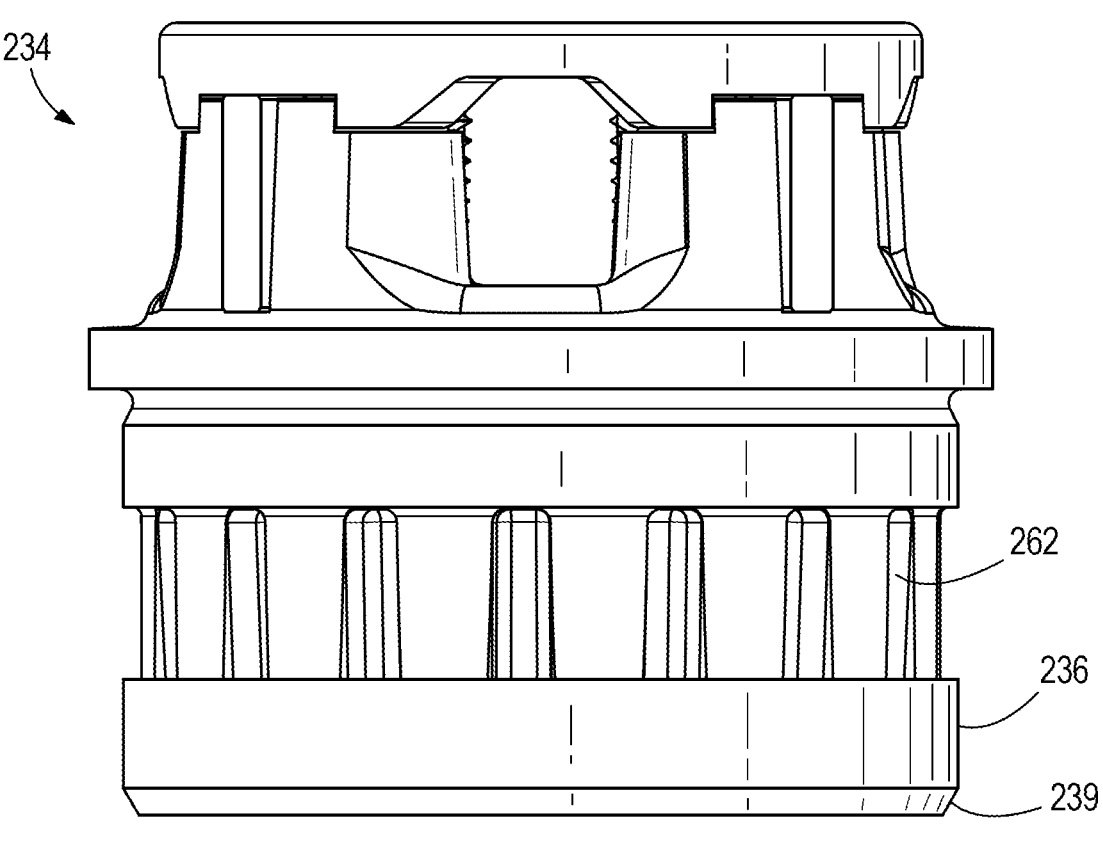
FIG. 11 is a plan view of the die head of FIG. 9.
Figure 12:
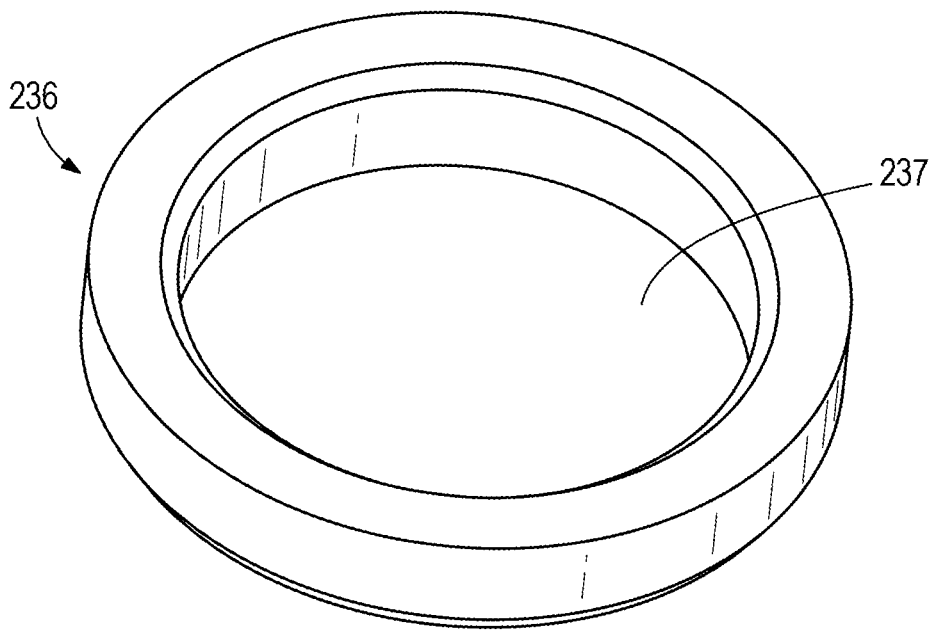
FIG. 12 is a perspective view of a retention ring of the die head of FIG. 9.

FIGS. 9-12 illustrates another embodiment of a die head 234. The die head 234 is similar to the die head 34 described above, and like features are identified with like reference numerals in the 200 series. The drive portion 262 of the die head 234 includes a retention ring 236 that is separable from the remainder of the drive portion 262. In other words, the retention ring 236 is removably attachable to the drive portion 262. The retention ring 236 defines a circular hollow interior 237 (FIG. 12) that is sized to be received by the straight end 266 of the drive portion 262 (FIG. 11). In some embodiments, the drive portion 262 may have an end that is all or partially curved. The retention ring 236 is formed of aluminum. In some embodiments, the retention ring 236 is formed of an alternative material. The retention ring 236 further includes an edge 239 that is chamfered. In some embodiments, the edge 239 may not be chamfered. The die head 234 is one piece, with the exception of the retention ring 236. In some embodiments, the die head 234 has greater than two parts. The retention ring 236 being a separate component allows for more efficient manufacturing of the die head 234. For instance, a general die head may be manufactured, instead of a custom die head which has an integrally formed retention ring thereon.

Figures 13, 14:
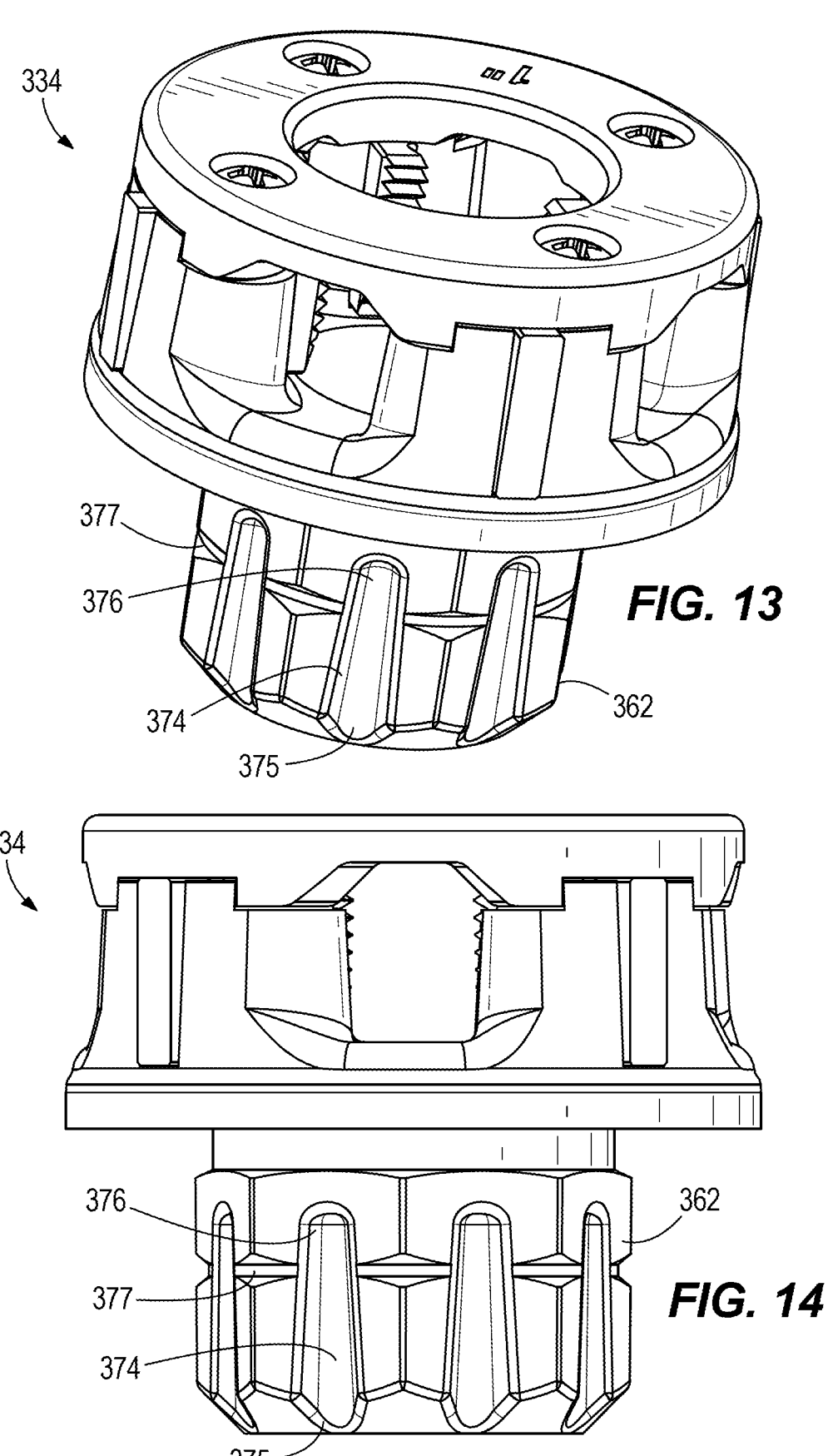
FIG. 13 is a perspective view of a die head according to an embodiment of the invention.
FIG. 14 is a plan view of the die head of FIG. 13.

FIGS. 13-14 illustrates another embodiment of a die head 334. The die head 334 is similar to the die head 34 described above, and like features are identified with like reference numerals in the 300 series. The discrete recesses 374 of the drive portion 362 are tapered such that a first end 375 of the discrete recess 374 has a width that is greater than a width of a second end 376 of the discrete recess 374. A detent extends 377 between adjacent discrete recesses 374. The drive portion 362 does not include a curvilinear end 66 or a cylindrical portion 78. In some embodiments, the drive portion 362 may include one, or both, of a curvilinear end 66 and/or a cylindrical portion 78.

Figure 15:
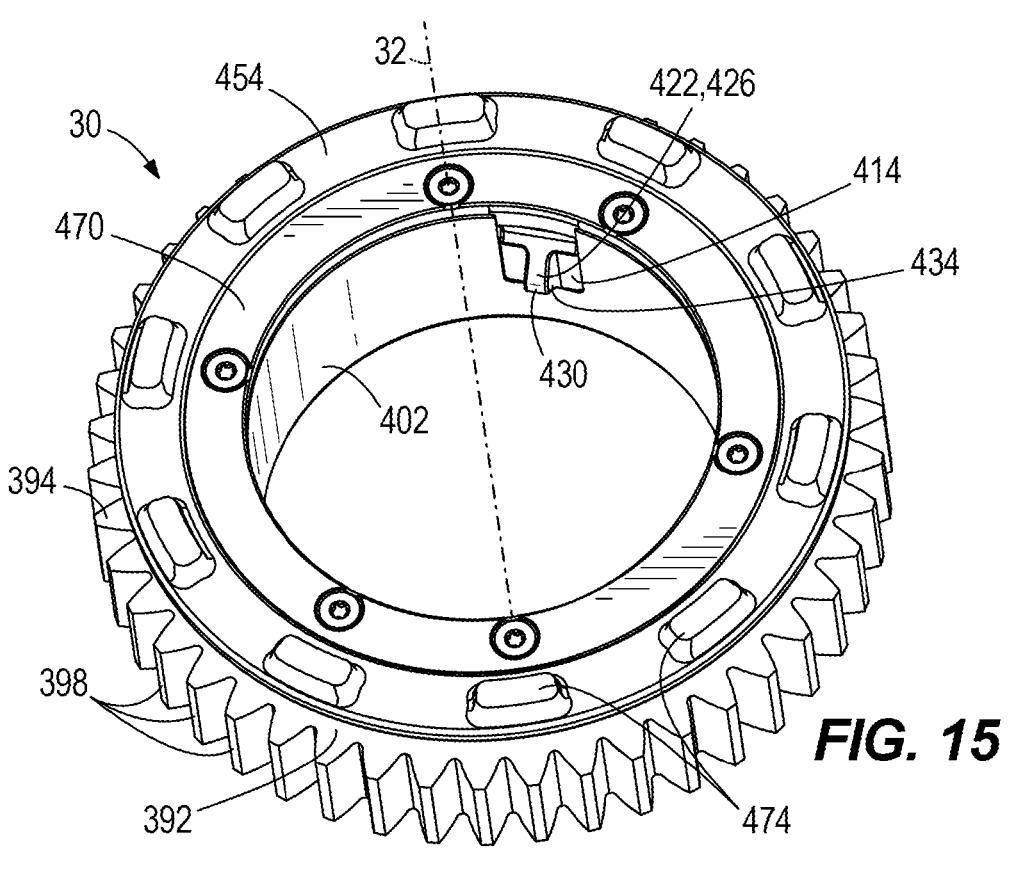
FIG. 15 is a perspective view a die head retainer of the pipe threader of FIG. 1.
Figure 16:
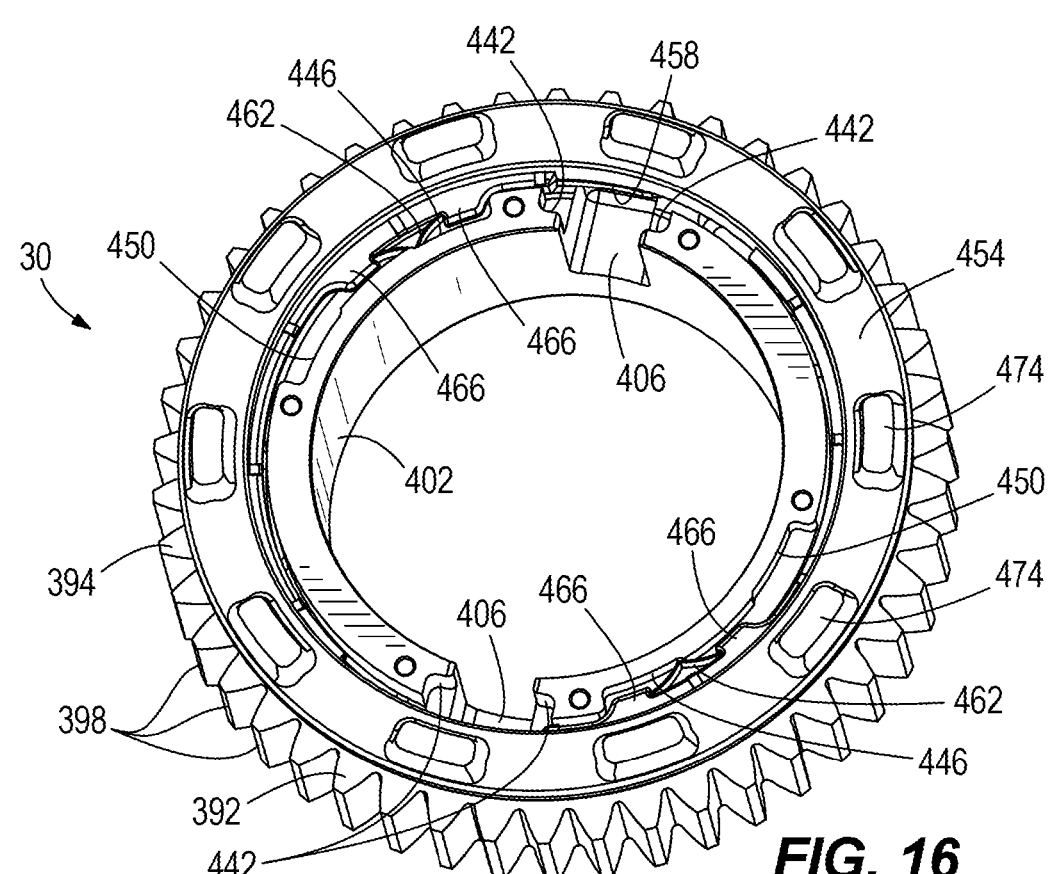
FIG. 16 is a perspective view of the die head retainer of FIG. 15, with portions removed.
Figure 17:
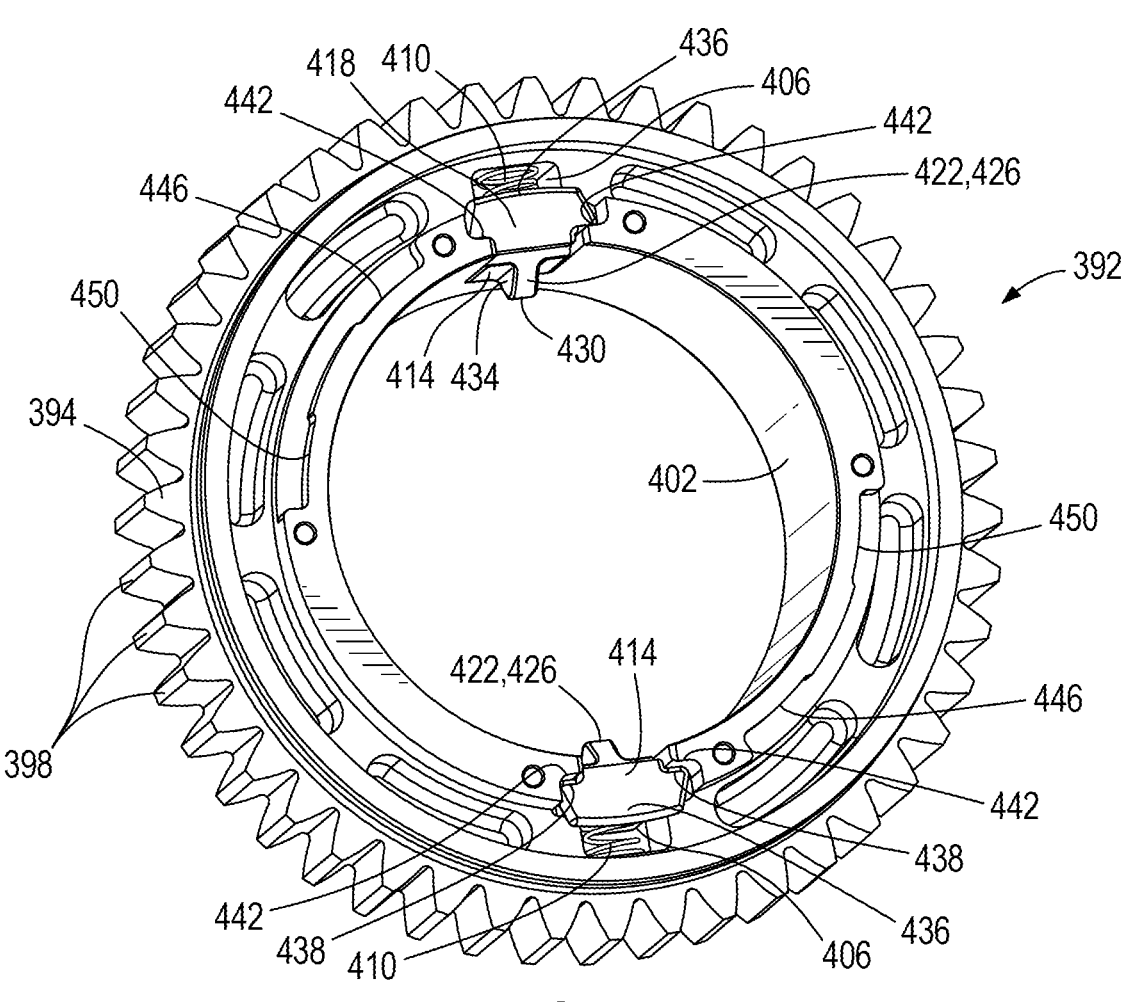
FIG. 17 is a perspective view of the die head retainer of FIG. 15, with portions removed.

FIGS. 15-20 illustrate the die head retainer 30 in more detail. The die head retainer 30 includes a gear member 392 having an outer circumference 394 with teeth 398 that are engaged with teeth 186 of the output gear 33, such that the output gear 33 may transmit torque from the drive assembly 18 to the die head retainer 30. The gear member 392 also includes an inner circumference 402 defining two key recesses 406 arranged opposite each other, as shown in FIG. 16. As shown in FIG. 17, a compression spring 410 and a torque key 414 are arranged in each key recess 406, such that the torque keys 414 are biased radially inward toward the rotation axis 32 (FIG. 15).

Figure 19:
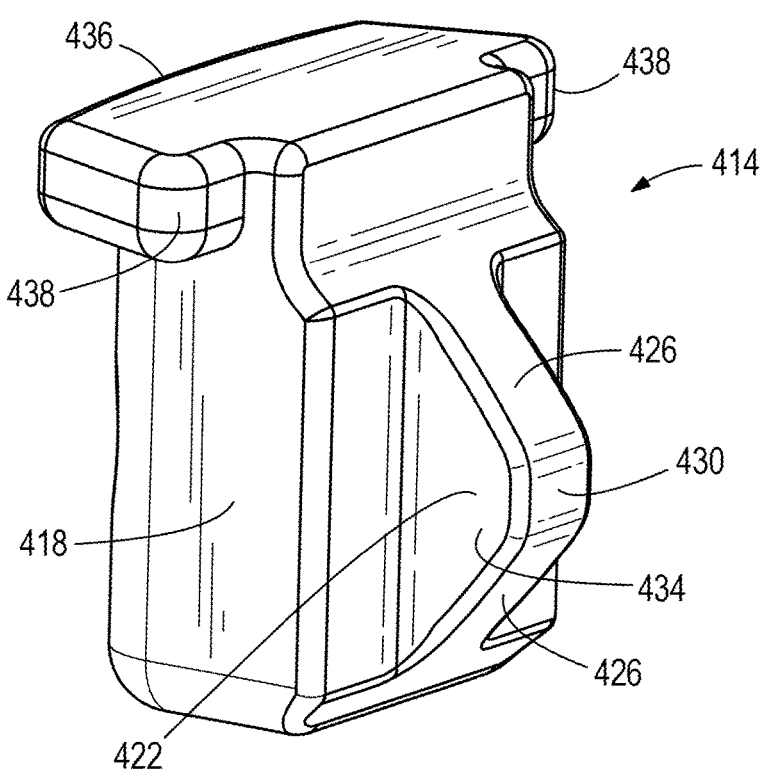
FIG. 19 is a perspective view of a key of the die head retainer of FIG. 15.
Figure 20:
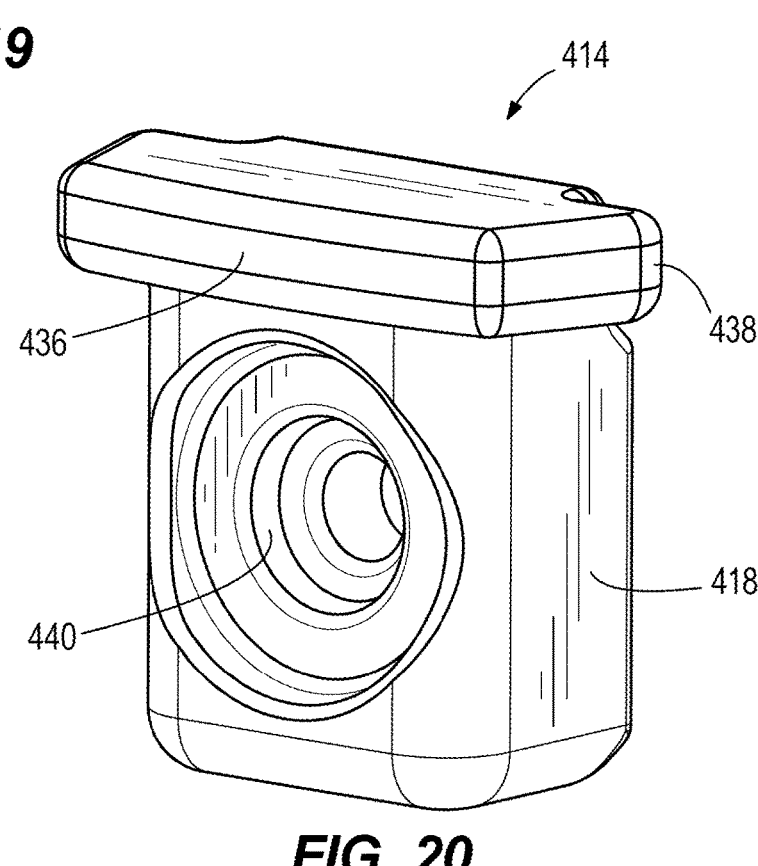
FIG. 20 is a reverse perspective view of the key of FIG. 19.

As shown in FIGS. 19 and 20, each torque key 414 has a body 418 and a key portion 422 extending radially inward from the body 418. The key portion 422 includes two edges 426 obliquely oriented with respect to the rotational axis 32, a flat nose 430 between the two edges 426, and two opposite side faces 434. A shoulder 436 extends radially outward from the body 418 and includes a pair of opposite wings 438 that extend laterally outward from the body 418. As shown in FIG. 20, on the side of the body 418 opposite the key portion 422, a spring recess 440 is defined in the body 418 to receive the compression spring 410.

As shown in FIGS. 16 and 17, the gear member 392 includes a pair of ledges 442 adjacent of each key recess 406. As the torque keys 414 are biased towards the rotation axis 32 by the springs 410, the wings 438 abut the ledges 442, thus constraining the keys 414 within the gear member 392. With continued reference to FIGS. 16 and 17, the gear member 392 also includes a pair of first detent recesses 446 and a pair of second detent recesses 450.

Figure 18:
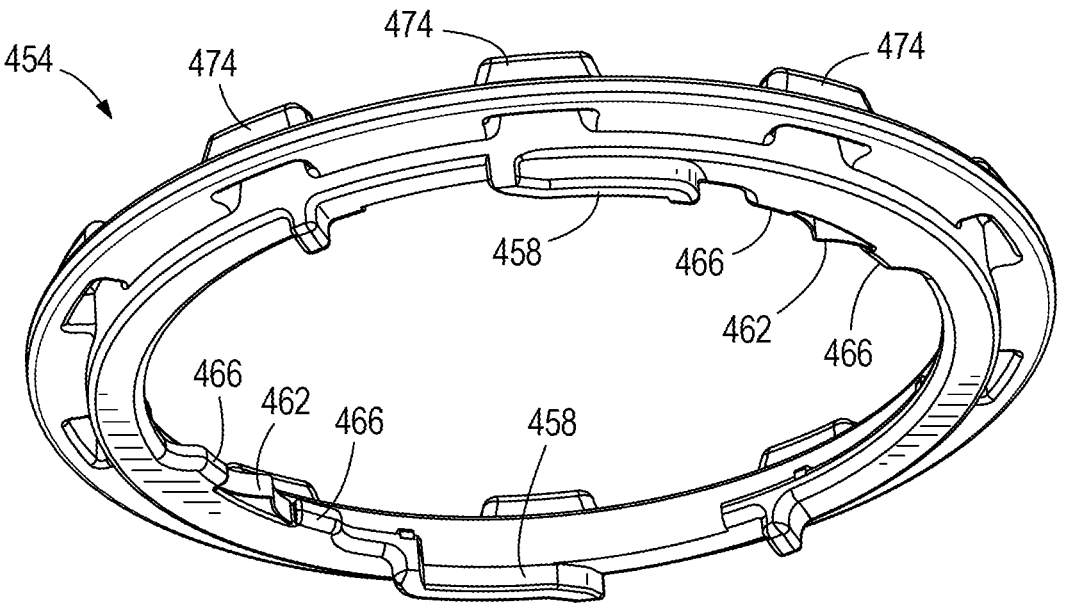
FIG. 18 is a perspective view of a lock ring of the die head retainer of FIG. 15.

As shown in FIGS. 15, 16 and 17, the die head retainer 30 also includes a lock ring 454 that is rotatable relative to the gear member 392, as explained below. As shown in FIGS. 16 and 18, the lock ring 454 includes a pair of axially extending contact surfaces 458 and a pair of detent members, such as leaf springs 462, that are each arranged between a pair of radially inward extending ledges 466. The ledges 466 are set underneath a retaining ring 470 (FIG. 15) fastened to the gear member 392, thus axially constraining the lock ring 454 on the gear member 392.

The lock ring 454 also includes a plurality of fins 474 (FIG. 18), permitting an operator to rotate the lock ring 454 with respect to the gear member 392. Specifically, the lock ring 454 is rotatable between a locked position (FIG. 16), in which the contact surfaces 458 are respectively arranged behind the shoulders 436 of the torque keys 414 and the leaf springs 462 are arranged in the first detent recesses 446, and an unlocked position, in which the contact surfaces 458 are rotated away from the shoulders 436 of the torque keys 414, such that the contact surfaces 458 do not radially overlap the shoulders 436, and the leaf springs 462 are arranged in the second detent recesses 450.

In operation, before inserting the die head 34 into the die head retainer 30, the operator first ensures that the lock ring 454 is in the unlocked position. If the lock ring 454 is in the locked position and the operator attempts to insert the die head 34, when the curvilinear end 66 of the die head 34 begins pressing against the key portions 422 of the respective keys 414, the keys 414 will be inhibited from moving away from the rotational axis 32 because the shoulders 436 are abutted against the contact surfaces 458 of the lock ring 454. Thus, the operator will be unable to insert the die head 34 into the die head retainer 30.

In order to permit insertion of the die head 34, the operator rotates the lock ring 454 from the locked position to the unlocked position, counterclockwise as viewed in FIGS. 15 and 16, causing the contact surfaces 458 to be rotated away from the shoulders 436 of the torque keys 414, such that the contact surfaces 458 do not radially overlap the shoulders 436, and the leaf springs 462 to be arranged in the second detent recesses 450. The operator then inserts the die head 34 into the die head retainer 30 along the rotational axis 32, causing the curvilinear end 66 of the drive 62 to begin pressing against the key portions 422 of the respective keys 414, thus forcing the keys 414 away from the rotational axis 32 against the biasing force of springs 410. As the operator continues inserting the die head 34, the cylindrical portion 78 of the die head 34 comes into contact with the nose 430 of the key portion 422, displacing the keys 414 completely within the key recesses 406. Once the engagement portion 70 of the die head 34 has become aligned with the key recesses 406 along the rotational axis 32, the keys 414 rebound due to the biasing force of springs 410 into respective recesses 74.

Once the die head 34 has been inserted into the die head retainer 30, and before operating the pipe threader 10, an operator rotates the lock ring 454 from the unlocked position back to the locked position, causing the contact surfaces 458 to be moved behind the shoulders 436 of the torque keys 414, such that the contact surfaces 458 radially overlap the shoulders 436, and the leaf springs 462 to be arranged in the first detent recesses 446. Once the lock ring 454 is in the locked position, inadvertent removal of the die head 34 from the die head retainer 30 is inhibited. Specifically, during operation, even if the die head 34 experiences a force tending to push or pull the die head 34 along the rotational axis 32 with respect to the die head retainer 30, the torque keys 414 will be inhibited from moving away from the rotational axis 32 because the shoulders 436 abut against the contact surfaces 458 of the lock ring 454, and thus the torque keys 414 are inhibited from exiting the recesses 74 of the die head 34.

Once the lock ring 454 is moved to the locked position while the die head 34 is in the die head retainer 30, the operator then arranges the die head 34 on a pipe to be threaded. The operator then presses the trigger 50 to activate motor 22, which transfers torque through the transmission 26 to the output gear 50, thus causing the die head retainer 30 to begin rotating. As the die head retainer 30 rotates, torque is transferred from the die head retainer 30, through the torque keys 414, and to the die head 34 via the side faces 434 of the key portions 422 of the torque keys 414 being arranged in the recesses 74, thus causing the die head 34 to rotate. Because of the application of force against projection 36 or 40, the die head 34 begins moving along the pipe to cut threads on the pipe. Once the pipe-threading operation has been completed, the operator may remove the die head 34 from the pipe.

Before removing the die head 34 from the die head retainer 30, the operator first rotates the lock ring 454 to the unlocked position, thus rotating the contact surfaces 458 away from the shoulders 436 of the torque keys 414. The operator then removes the die head 34 from the die head retainer 30 by pulling the die head 34 from the die head retainer 30 in a direction opposite of which it was inserted. As the die head 34 is removed, the cylindrical portion 78 of the die head 34 slides along the edges 426 of the key portions 422, thus forcing the keys 414 away from the rotational axis 32 and into the key recesses 406, thereby unlocking the die head 34 from the die head retainer 30.

Although the invention has been described in detail with reference to certain preferred embodiments, variations and modifications exist within the scope and spirit of one or more independent aspects of the invention as described.

What is claimed is:

1. A die head for cutting threads in a pipe, the die head comprising:
a drive portion having a plurality of recesses configured to receive torque from a pipe threading machine;
a die retention portion including a plurality of die posts, each die post configured to receive a die having teeth for cutting the threads in the pipe;
a cap coupled to the die retention portion, the cap including a plurality of mating posts, each of the plurality of mating posts being configured to mate with one of the die posts and having a protrusion configured to fit within a notch of each die; and
a plurality of windows, each window defined between each pair of adjacent die posts and the cap;
wherein an end of each die adjacent the cap is visible through a corresponding window of the plurality of windows such that all of the teeth of the die are visible through the corresponding window.

2. The die head of claim 1, wherein the die retention portion includes four die posts.

3. The die head of claim 1, wherein each die post includes a first half, a second half, and a slot between the first half and the second half, the slot being configured to receive the die.

4. The die head of claim 3, wherein each of the plurality of mating posts includes a first half with a first surface configured to mate against the first half of the die post, a second half with a second surface configured to mate against the second half of the die post, and a third surface in between the first half and the second half, the third surface configured to mate against a top surface of the die post.

5. The die head of claim 1, wherein the drive portion includes a curvilinear end, a circumferential engagement portion having the plurality of recesses, and a cylindrical portion between the engagement portion and the curvilinear end.

6. The die head of claim 1, wherein the drive portion includes a retention ring that is removably attachable to the drive portion.

7. The die head of claim 1, wherein the die retention portion is formed of aluminum.

8. The die head of claim 7, wherein the die retention portion is integrally formed as a single piece with the drive portion.

9. A die head comprising:
a drive portion having a plurality of recesses configured to receive torque from a pipe threading machine;

a die retention portion including a plurality of die posts, each die post configured to receive a die, each die post having a top surface opposite from the drive portion, the top surfaces defining a first plane;
a cap coupled to the die retention portion, the cap including a plurality of mating posts and a plurality of ledges arranged between the plurality of mating posts, each mating post configured to mate with the top surface of a corresponding die post, the plurality of ledges defining a second plane that is spaced from and parallel with the first plane; and
a plurality of windows, each window defined between a pair of adjacent die posts and a corresponding ledge of the plurality of ledges.

10. The die head of claim 9, wherein the die retention portion includes four die posts.

11. The die head of claim 9, wherein each window of the plurality of windows is sized such that teeth of each die are visible through the plurality of windows.

12. The die head of claim 9, wherein the die retention portion is formed of aluminum.

13. The die head of claim 9, wherein the drive portion includes a retention ring that is removably attachable to the drive portion.

14. The die head of claim 9, wherein the first plane is spaced from the second plane a distance between 2 and 3 mm.

15. A die head for cutting threads in a pipe, the die head comprising:
a drive portion having a plurality of recesses configured to receive torque from a pipe threading machine;
a die retention portion including a plurality of die posts, each die post configured to receive a die having teeth for cutting the threads in the pipe;
a cap coupled to the die retention portion; and
a plurality of windows, each window defined between each pair of adjacent die posts and the cap;
wherein an end of each die adjacent the cap is visible through a corresponding window of the plurality of windows such that all of the teeth of the die are visible through the corresponding window,
wherein each die post includes a first half, a second half, and a slot between the first half and the second half, the slot being configured to receive the die,
wherein the cap includes a plurality of mating posts, each of the plurality of mating posts being configured to mate with one of the die posts, and
wherein each of the plurality of mating posts includes a first half with a first surface configured to mate against the first half of the die post, a second half with a second surface configured to mate against the second half of the die post, and a third surface in between the first half and the second half, the third surface configured to mate against a top surface of the die post.

* * * * *